(12) United States Patent
Zer et al.

(10) Patent No.: US 9,864,154 B1
(45) Date of Patent: Jan. 9, 2018

(54) FIELD REPLACEABLE MODULAR OPTICAL INTERCONNECT UNIT WITH OPTICAL MODULE FOR DATACENTER SWITCH SYSTEM

(71) Applicant: Mellanox Technologies, Ltd., Yokneam (IL)

(72) Inventors: Yoram Zer, Yokneam (IL); Pierre Avner Badehi, Yehuda (IL); Shy Zimmerman, Kibutz Magal (IL); Natan Kirshner, Modi'in (IL); Avi Gibbs, Rehovot (IL); Nimer Khazen, Ba'ne Village (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 15/186,897

(22) Filed: Jun. 20, 2016

(51) Int. Cl.
*G02B 6/44* (2006.01)
*G02B 6/42* (2006.01)

(52) U.S. Cl.
CPC .......... *G02B 6/4261* (2013.01); *G02B 6/428* (2013.01); *G02B 6/4278* (2013.01); *G02B 6/4284* (2013.01); *G02B 6/4292* (2013.01)

(58) Field of Classification Search
USPC ....................................................... 385/135
See application file for complete search history.

(56) References Cited

U.S. PATENT DOCUMENTS 6,822,874 B1 * 11/2004 Marler ................. H05K 7/1452
361/724
2015/0063771 A1 * 3/2015 Mogul ..................... G02B 6/43
385/135

* cited by examiner

*Primary Examiner* — Eric Wong
(74) *Attorney, Agent, or Firm* — Alston & Bird LLP (57) ABSTRACT

Apparatuses, systems, and methods of assembly are described that provide mechanisms for integrating an optical module (e.g., an MBOM) into a main switch system to allow the optical module to be replaced without having to replace other components of the main switch system. The field replaceable modular optical interconnect unit includes a housing, a printed circuit board assembly supported within the housing, an optical module supported on the printed circuit board assembly that converts between optical signals and electrical signals for transmitting or receiving optical signals through a fiber optic cable, a board-to-board connector on a rear panel of the housing that enables electrical signals to be transmitted between the printed circuit board assembly and a main switch system box, and an external connector on a front panel of the housing that can engage an external optical fiber for transmitting optical signals between the optical module and an external component.

20 Claims, 4 Drawing Sheets

FIELD REPLACEABLE MODULAR OPTICAL INTERCONNECT UNIT WITH OPTICAL MODULE FOR DATACENTER SWITCH SYSTEM

BACKGROUND

The present disclosure relates in general to datacenter switch systems with modular on board optical interconnects. In particular, field replaceable modular optical interconnect units including an integrated optical module are described that are configured for use in datacenter main switch systems.

As datacenters for the transmission of optical signals over fiber optic networks become more advanced and demand for the support of higher-speed protocols increases, the transceivers for converting between electrical and optical signals are being moved closer to the main switch ASIC (the application-specific integrated circuit) to accommodate this need. In some cases, the optoelectronic transceiver is replaced by a Mid Board Optical Module (MBOM) or similar electrical to optical conversion solution, which is integrated into the board of the main switch and, thus, reduces the distance to the main switch ASIC, thereby enabling an easier implementation of electrical high speed routing.

BRIEF SUMMARY

Although the use of conventional optical modules (e.g., MBOMs) serves to reduce the electrical routing distance to the main switch ASIC, optical modules are generally associated with lower reliability as compared to other parts of the switch system because optical components typically have a lower mean time between failures (MTBF) as compared to electrical components. There is therefore a need for an assembly that includes an optical module that is configured for use within convention switch systems, but allows the optical module to be more easily replaced or changed out in the field without disturbing other components of the main switch.

Accordingly, embodiments of a field replaceable modular optical interconnect unit are described that are configured to be received by a main switch system box. The field replaceable modular optical interconnect unit comprises a housing comprising at least a front panel, a rear panel, and side panels extending between the front and rear panels, a printed circuit board assembly supported within the housing, an optical module supported on the printed circuit board assembly and configured to convert between optical signals and corresponding electrical signals for respectively transmitting or receiving optical signals through a fiber optic cable, a board-to-board connector disposed on the rear panel of the housing and configured to enable electrical signals to be transmitted between the printed circuit board assembly and a main switch system box, and an external connector disposed on the front panel of the housing and configured to engage an external optical fiber for transmitting optical signals between the optical module and an external component. The field replaceable modular optical interconnect unit may be configured to be electrically connected to the main switch system box via engagement of the board-to-board connector with a corresponding connector of the main switch system box when the housing is received by the main switch system box.

In some embodiments, the optical module may be a mid board optical module (MBOM), and/or the field replaceable modular optical interconnect unit may comprise a plurality of external connectors. For example, the external connector may be a first external connector, and the field replaceable modular optical interconnect unit may further comprise a second external connector disposed on the front panel of the housing and configured to enable transmission of electrical signals between the printed circuit board assembly and an external component connected thereto.

In some cases, the side panels of the housing of the field replaceable modular optical interconnect unit may comprise an engaging feature configured to mate with a corresponding engaging feature of the main switch system box for enabling the field replaceable modular optical interconnect unit to be received therein. Moreover, the front panel of the housing may define a handle configured to be gripped by a user for extracting the field replaceable modular optical interconnect unit from the main switch system box. Additionally or alternatively, the housing may further comprise a top panel configured to enclose the optical module within the housing.

In some embodiments, the optical module may be a first optical module, and the field replaceable modular optical interconnect unit may further comprise at least a second optical module supported by the printed circuit board assembly and coupled to the external connector associated with the first optical module or a separate external connector.

In other embodiments, a method of assembling a field replaceable modular optical interconnect unit is provided, where the field replaceable modular optical interconnect unit is configured to be received by a main switch system box. The method comprises constructing a housing, wherein the housing comprises at least a front panel, a rear panel, and side panels extending between the front and rear panels. The method further comprises disposing a printed circuit board assembly within the housing; supporting an optical module on the printed circuit board assembly, wherein the optical module is configured to convert between optical signals and corresponding electrical signals for respectively transmitting or receiving optical signals through a fiber optic cable; installing a board-to-board connector on the rear panel of the housing, wherein the board-to-board connector is configured to enable electrical signals to be transmitted between the printed circuit board assembly and a main switch system box; and installing an external connector on the front panel of the housing, wherein the external connector is configured to engage an external optical fiber for transmitting optical signals between the optical module and an external component. The field replaceable modular optical interconnect unit is configured to be electrically connected to the main switch system box via engagement of the board-to-board connector with a corresponding connector of the main switch system box when the housing is received by the main switch system box.

In some cases, supporting an optical module on the printed circuit board assembly may comprise supporting a mid board optical module (MBOM) on the printed circuit board assembly. Moreover, the external connector may be a first external connector, and the method may further comprise installing a second external connector on the front panel of the housing that is configured to enable transmission of electrical signals between the printed circuit board assembly and an external component.

In some embodiments, the method may further comprise providing an engaging feature on the side panels of the housing that are configured to mate with a corresponding engaging feature of the main switch system box for enabling the field replaceable modular optical interconnect unit to be received therein. Additionally or alternatively, the method may further comprise securing a handle to the front panel of the housing, wherein the handle is configured to be gripped by a user for extracting the field replaceable modular optical interconnect unit from the main switch system box. Constructing the housing may, in some cases, further comprise attaching a top panel to the front, rear, and side panels for enclosing the optical module within the housing. In still other cases, the optical module may be a first optical module, and the method may further comprise supporting at least a second optical module on the printed circuit board assembly and coupling the second optical module to the external connector associated with the first optical module or a separate external connector. In this regard, the second optical module may be configured to convert between optical signals and corresponding electrical signals for respectively transmitting or receiving optical signals through a fiber optic cable.

In still other embodiments, a system is provided for converting between electrical signals and optical signals in a datacenter. The system comprises a main switch system box configured to transmit and receive electrical signals and a field replaceable modular optical interconnect unit configured to be received by the main switch system box. The field replaceable modular optical interconnect unit comprises a housing comprising at least a front panel, a rear panel, and side panels extending between the front and rear panels; a printed circuit board assembly supported within the housing; an optical module supported on the printed circuit board assembly and configured to convert between optical signals and corresponding electrical signals for respectively transmitting or receiving optical signals through a fiber optic cable; a board-to-board connector disposed on the rear panel of the housing and configured to enable electrical signals to be transmitted between the printed circuit board assembly and a main switch system box; and an external connector disposed on the front panel of the housing and configured to engage an external optical fiber for transmitting optical signals between the optical module and an external component. The field replaceable modular optical interconnect unit is configured to be electrically connected to the main switch system box via engagement of the board-to-board connector with a corresponding connector of the main switch system box when the housing is received by the main switch system box.

In some cases, the main switch system box may be configured to receive multiple field replaceable modular optical interconnect units, and the main switch system box may be configured to operate each field replaceable modular optical interconnect unit individually or collectively. Moreover, each field replaceable modular optical interconnect unit may comprise external connectors having different size and fiber channel counts.

Additionally or alternatively, the side panels of the housing of the field replaceable modular optical interconnect unit may comprise an engaging feature configured to mate with a corresponding engaging feature of the main switch system box for enabling the field replaceable modular optical interconnect unit to be received therein. In some cases, the external connector may be a first external connector, and the field replaceable modular optical interconnect unit may further comprise a second external connector disposed on the front panel of the housing and configured to enable transmission of electrical signals between the printed circuit board assembly and an external component connected thereto. Furthermore, the front panel of the housing may, in some embodiments, define a handle configured to be gripped by a user for extracting the field replaceable modular optical interconnect unit from the main switch system box.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. Accordingly, as an example, the term "front panel" may be used to describe a panel; however, the panel may be in the front or in the rear, depending on the orientation of the particular item being described.

Extensive growth in global internet traffic due to increasing demands for high-definition video and high-speed broadband penetration has required new hardware that allows for higher data transmission rates. Traditionally, copper is used as the transmission medium for electrical signals in main networking cables. While copper is relatively cost effective with well-controlled electrical and mechanical parameters, optical transmission systems often provide cheaper and more reliable networking systems. Optical fiber, for example, offers enhanced capacity (e.g., greater bandwidth) over distance, increased bandwidth density, greater security and flexibility, and lower costs as compared to metal cables.

Quad Small Form-factor Pluggable (QSFP) connectors and cables, as well as other forms of connectors such as Small Form Pluggable (SFP) and C-Form-factor Pluggable (CFP) connectors, have long been the industry standard for providing high-speed information operations interface interconnects. These transceivers interface a switch system board, such as a motherboard in a switch system, to a fiber optic or copper networking cable. For example, these optical transceivers may be used in datacenters, as shown in FIG. 1, to make connections between main switch system boxes 5.

Figure 1:
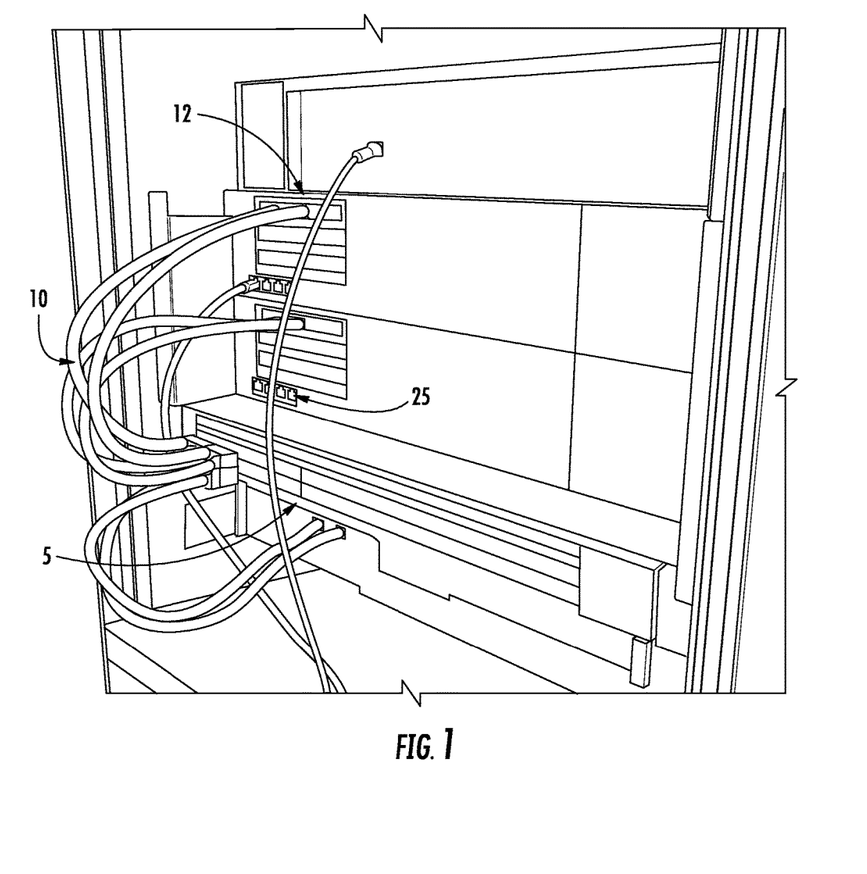
FIG. 1 is a front perspective view of a rack of main switch systems boxes in a datacenter according to an example embodiment.

With continued reference to FIG. 1, for example, a main switch system box 5, which houses the ASIC as well as other internal components (not visible), is typically incorporated into a datacenter network via connections to other switch systems, servers, and network components. A main switch system box 5 may, for example, interact with other components of the datacenter via external networking cables 10 and transceivers 12. These networking cables 10 and transceivers 12 may connect to the main switch system box 5 and the other components of the datacenter network via external connectors 25 of the main switch system box 5. Although externally connected transceivers 12 allow for the use of fiber optic cables to help meet the requirements of increased high-speed data transmission, the distance from the main switch application-specific integrated circuit (ASIC) to these transceivers may reduce their effectiveness.

As noted above, in an effort to move the optoelectronic transceiver closer to the ASIC of the main switch system, optical modules that are configured to be mounted onto a printed circuit board (PCB), such as mid board optical modules (MBOMs), can be used to replace externally connected transceivers, such as those shown in FIG. 1. An MBOM, for example, includes an optoelectronic transceiver and components that are integrally connected to the circuit board of the main switch system, and would thus be housed internally within the main switch system box 5 of FIG. 1. As a result, an MBOM has advantages over an externally-connected transceiver because of the ability to shorten the electrical distance to the main switch ASIC, thus allowing the MBOM to support higher protocol speeds with shorter PCB electrical routing and resulting in higher input and output densities while making the entire system more power-efficient. As also noted above, however, because optical components generally have a lower mean time between failures as compared to electrical components, MBOMs tend to experience failures more frequently than the other electrical components of the switch system.

Because conventional techniques for utilizing an MBOM in a switch system involve integrating the MBOM directly into the PCB of the main switch system in an effort to position the transceiver nearer to the ASIC, a failure of the MBOM generally requires that the entire switch system or PCB be accessed and/or replaced. This often results in increased costs to address MBOM failures, as more labor to repair or replace the optical components may be needed and the entire switch system is typically affected, resulting in longer periods of downtime. These additional costs can significantly reduce the benefits that the use of MBOMs provides.

Accordingly, embodiments of the present invention described herein provide mechanisms for integrating an MBOM (or any other electrical to optical converter unit, such as any optical module that can be mounted onto printed circuit boards and/or is compliant with standards provided by the Consortium for On-Board Optics (COBO)) into the main switch system in a way that allows the MBOM to be replaced without having to access or replace other components of the main switch system. In particular, embodiments of the invention provide an MBOM that is separately and modularly housed, such that the MBOM can be incorporated into the main switch system box (e.g., such as the main switch system box 5 of FIG. 1) to achieve the benefits of an integrated MBOM in terms of distance of the transceiver to the ASIC while allowing the MBOM to be easily separated from the main switch system for repair or replacement.

Figure 2:
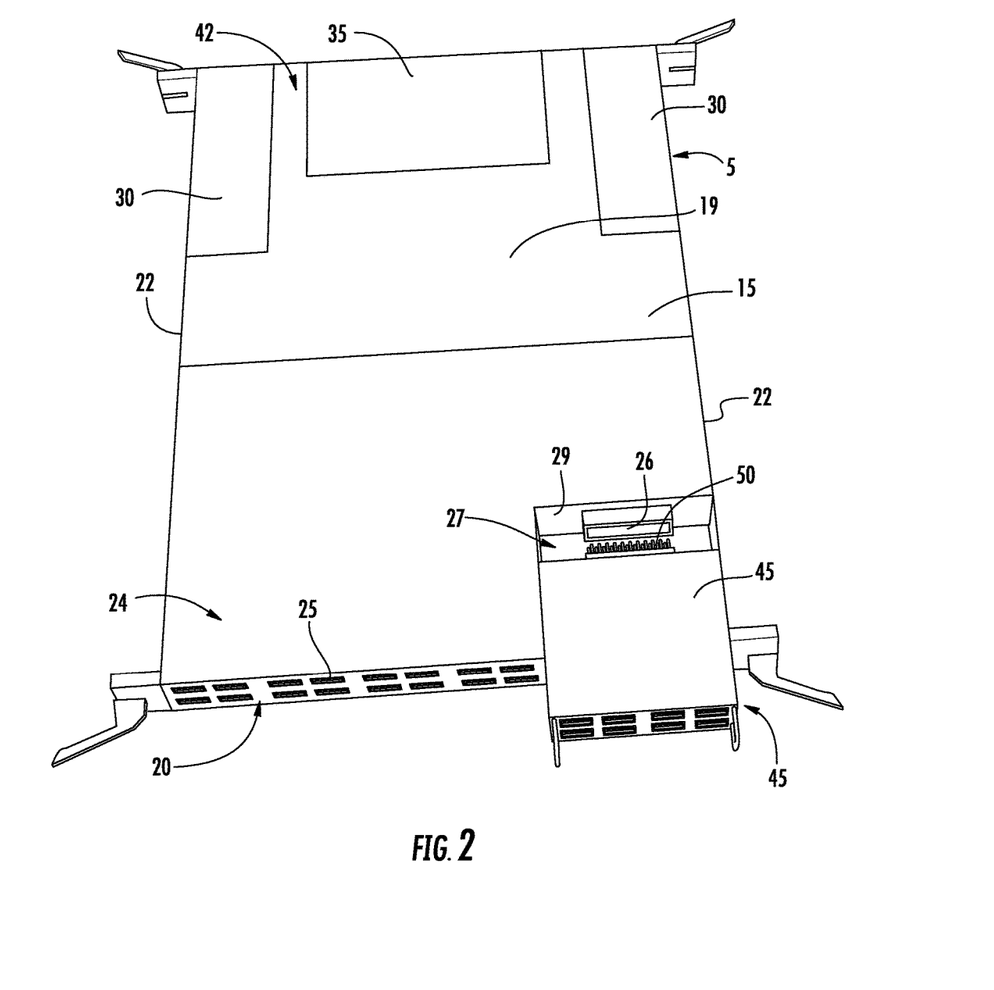
FIG. 2 is a front perspective view of a main switch system box with a field replaceable modular optical interconnect unit in an unengaged configuration according to an example embodiment.

With reference now to FIG. 2, a main switch system box 5 is shown that is configured to receive a field-replaceable unit (FRU). Conventional FRUs for switch systems may include parts or assemblies for providing power, cooling, and other functions for the operation of the switch system. Embodiments of the present invention, however, provide a field replaceable modular optical interconnect unit 45 that is configured to be received by a main switch system box 5 using existing connections of the main switch system box, as described in greater detail below.

For example, the main switch system box 5, as shown in FIG. 2, may be defined by a housing 15 that includes a front panel 20, a rear panel 40, and top 19, bottom, and side panels 22. The front panel 20 may include one or more external connectors 25 that are configured to receive and engage with external optical cables 10 (shown in FIG. 1). A rear portion 42 of the main switch system box 5, proximate the rear panel 40, may be configured to receive FRUs for providing various functionality to the main switch system box. In some cases, for example, the main switch system box 5 may be configured to receive and connect to a power supply 30, a cooling fan 35, or other FRUs.

With continued reference to FIG. 2, a front portion 24 of the main switch system box 5, proximate the front panel 20, may be configured to receive a field replaceable modular optical interconnect unit 45 in accordance with embodiments of the present invention. In this regard, the front portion 24 may define a cut out 27 that is configured (e.g., sized and shaped) to accommodate the housing of the field replaceable modular optical interconnect unit 45, which is described in greater detail below. Moreover, a board-to-board connector 26 may be provided on a front surface 29 of the cut out 27, which is configured to electrically connect the field replaceable modular optical interconnect unit 45 to the PCB of the main switch system box 5.

Figure 3:
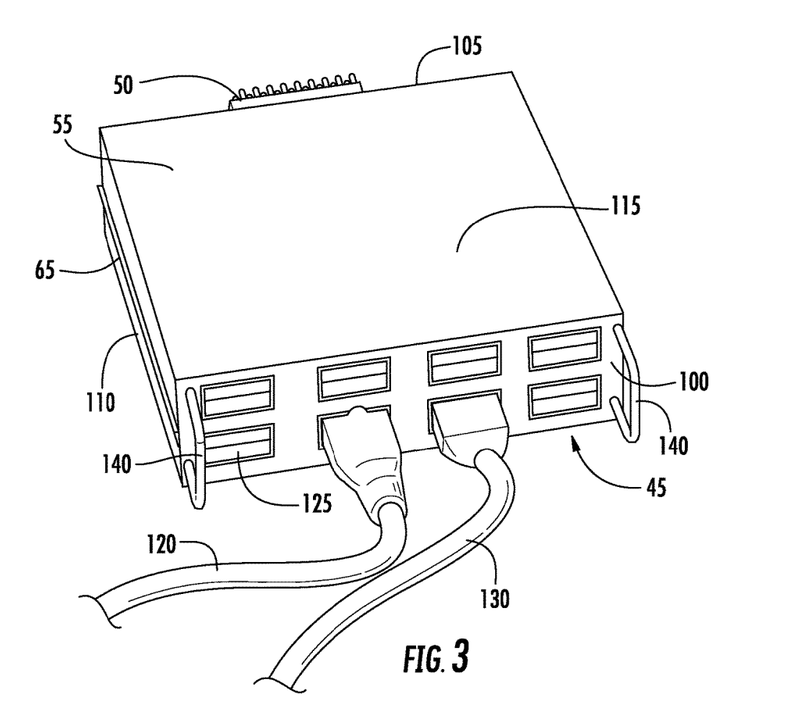
FIG. 3 is a front perspective view of the field replaceable modular optical interconnect unit according to an example embodiment.
Figure 4:
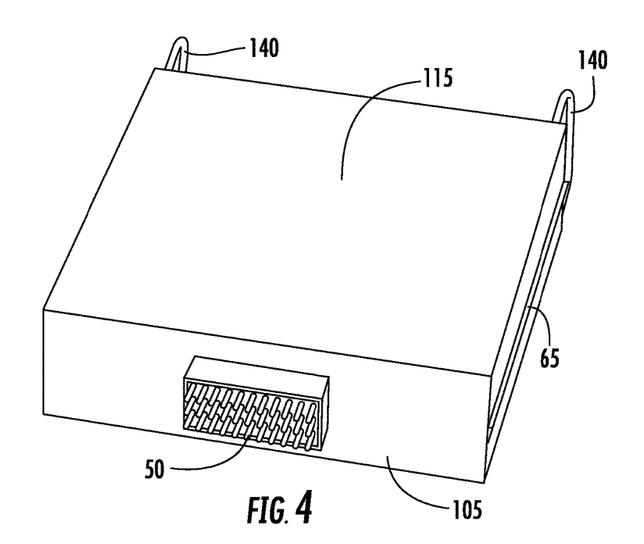
FIG. 4 is a rear perspective view of the field replaceable modular optical interconnect unit of FIG. 3 according to an example embodiment.
Figure 5:
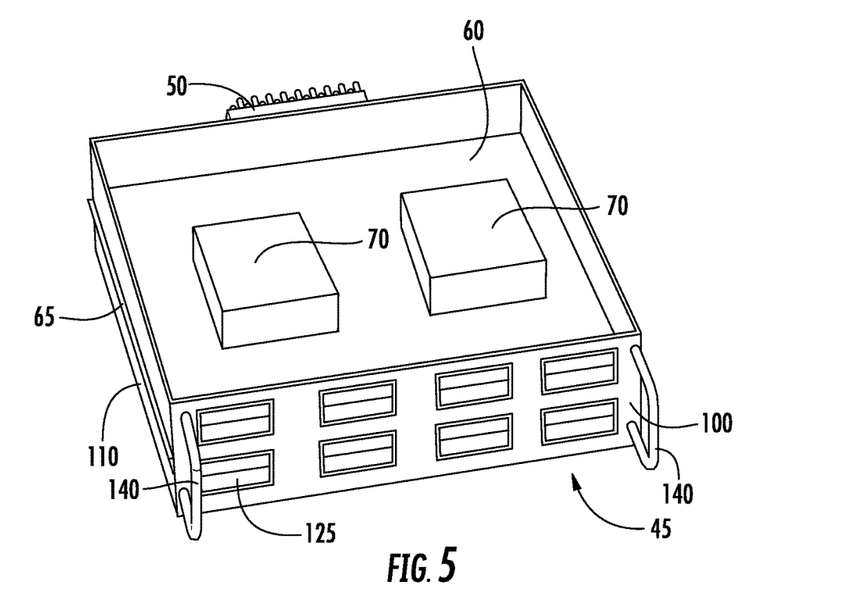
FIG. 5 is a front perspective view of the field replaceable modular optical interconnect unit of FIG. 3 with the top panel removed according to an example embodiment.

A field replaceable modular optical interconnect unit 45 according to embodiments of the present invention is shown in greater detail in FIGS. 3-5, with FIG. 3 showing a front view of the field replaceable modular optical interconnect unit, FIG. 4 showing a rear view, and FIG. 5 showing a top view with a portion of the housing removed to allow internal components of the field replaceable modular optical interconnect unit to be visible. With reference to FIGS. 3-5, embodiments of the field replaceable modular optical interconnect unit 45 may comprise a housing 55 that includes a front panel 100, a rear panel 105, and side panels 110 extending between the front and rear panels, as shown. The housing 55 may further include a top panel 115 that is configured to enclose the MBOM 70 within the housing. The field replaceable modular optical interconnect unit 45 may further include a PCB assembly 60 (shown in FIG. 5) supported within the housing and an MBOM 70 (shown in FIG. 5) supported on the PCB assembly. In this regard, the MBOM 70 may be configured to convert between optical signals and corresponding electrical signals for respectively transmitting or receiving optical signals through a fiber optic cable.

The field replaceable modular optical interconnect unit 45 may further comprise a board-to-board connector 50 disposed on the rear panel 105 of the housing 55, best shown in FIG. 4. The board-to-board connector 50 may be configured to enable electrical signals to be transmitted between the PCB assembly 60 and the main switch system box 5 of FIG. 2. In addition, the field replaceable modular optical interconnect unit 45 may further include one or more external connectors 125, shown in FIG. 3, that are disposed on the front panel 100 of the housing 55 and are configured to engage an external optical fiber 120 for transmitting optical signals between the MBOM 70 and an external component, such as another main switch system box. In some embodiments, the field replaceable modular optical interconnect unit 45 may, for example, include a number of external connectors 125, such as eight connectors, as shown in the figures. In this way, according to embodiments of the present invention, the field replaceable modular optical interconnect unit 45 may be configured to be electrically connected to the main switch system box 5 (FIG. 2) via engagement of the board-to-board connector 50 with a corresponding connector 26 (FIG. 2) of the main switch system box when the housing 55 of the field replaceable modular optical interconnect unit 45 is received by the main switch system box 5 (e.g., via the cut out 27).

In some embodiments, in cases in which a plurality of external connectors 125 are provided, one or more of the external connectors may be first external connectors that are configured to transmit optical signals between the MBOM 70 and an external component, whereas one or more of the external connectors may be second external connectors that are configured to enable transmission of electrical signals between the PCB assembly 60 and an external component (not shown) connected thereto, such as via an electric cable 130. The external connectors 125 thus allow the user to utilize the field replaceable modular optical interconnect unit 45 to obtain a direct electrical connection to the main switch system box 5 via the PCB assembly 60 and the board-to-board connectors 50, 26 connecting the field replaceable modular optical interconnect unit 45 to the main switch system box 5.

With reference to FIGS. 2 and 3, the field replaceable modular optical interconnect unit 45 may be configured to be received by the cut out 27 of the main switch system box 5 and may electrically connect to the PCB therein via a number of different ways. For example, in one case, the side panels 22 of the housing 55 may comprise an engaging feature 65 that is configured to mate with a corresponding engaging feature of the main switch system box 5 for enabling the field replaceable modular optical interconnect unit 45 to be received therein. The engaging feature 65 may, for example, comprise one or more rails or grooves that are configured to engage with a corresponding groove or rail, respectively, of the main switch system box for aligning and supporting the field replaceable modular optical interconnect unit 45 within the cut out 27 of the main switch system box 5 and enabling the electrical connection via the board-to-board connectors 50, 26. Moreover, the front panel 100 of the housing 55 may define one or more handles 140 configured to be gripped by a user for extracting the field replaceable modular optical interconnect unit 45 from the main switch system box 5. Although a particular configuration of a handle 140 is shown in FIGS. 2-5, the handle may be configured in a number of ways, including as a single tab or protrusion, a flexible extension, or any other type of grippable surface that does not interfere with the external connectors 125 or the connections made thereby.

As noted above, FIG. 5 shows the field replaceable modular optical interconnect unit 45 with the top panel 115 removed for purposes of explanation. As shown in FIG. 5, in some embodiments, the field replaceable modular optical interconnect unit 45 may comprise more than one MBOM 70. Thus, a first MBOM and a second MBOM (and/or other MBOMs, not shown) may be supported by the PCB assembly 60 of the field replaceable modular optical interconnect unit 45, such that each MBOM 70 is configured to convert between optical signals and corresponding electrical signals.

In this regard, the first and second MBOMs 70 may be coupled to the same external connector 125 or to different external connectors, such that the second MBOM may be able to transmit or receive optical signals to or from, respectively, the same external connector associated with the first MBOM or a separate external connector.

Figure 6:
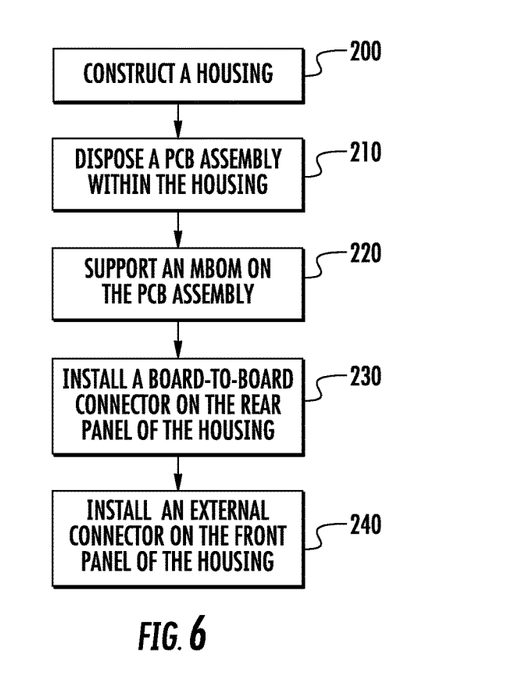
FIG. 6 is a flow chart depicting a method of assembling a field replaceable modular optical interconnect unit according to an example embodiment.

With reference now to FIG. 6, embodiments of a method of assembling a field replaceable modular optical interconnect unit configured to be received by a main switch system box are provided. Embodiments of the method may comprise constructing a housing at Block 200, wherein the housing comprises at least a front panel, a rear panel, and side panels extending between the front and rear panels; disposing a PCB assembly within the housing at Block 210; and supporting an MBOM on the PCB assembly at Block 220, wherein the MBOM is configured to convert between optical signals and corresponding electrical signals for respectively transmitting or receiving optical signals through a fiber optic cable. The method may further comprise installing a board-to-board connector on the rear panel of the housing at Block 230, wherein the board-to-board connector is configured to enable electrical signals to be transmitted between the printed circuit board assembly and a main switch system box, and installing an external connector on the front panel of the housing at Block 240, wherein the external connector is configured to engage an external optical fiber for transmitting optical signals between the MBOM and an external component. As described above, the field replaceable modular optical interconnect unit may thus be configured to be electrically connected to the main switch system box via engagement of the board-to-board connector with a corresponding connector of the main switch system box when the housing is received by the main switch system box.

In some embodiments, installing the external connector comprises installing a plurality of external connectors to the front panel of the housing. In some cases, as described above, the external connector may be a first external connector, and the method may further comprise installing a second external connector on the front panel of the housing that is configured to enable transmission of electrical signals between the printed circuit board assembly and an external component.

In still other cases, the method may further comprise providing an engaging feature on the side panels of the housing that is configured to mate with a corresponding engaging feature of the main switch system box for enabling the field replaceable modular optical interconnect unit to be received therein. The engaging feature may, for example, be one or more grooves or rails that are configured to engage rails or grooves, respectively, provided on a mating surface of the main switch system box.

As described above, a handle may be secured to the front panel of the housing in some cases, wherein the handle is configured to be gripped by a user for extracting the field replaceable modular optical interconnect unit from the main switch system box. Additionally or alternatively, constructing the housing may, in some cases, further comprise attaching a top panel to the front, rear, and side panels for enclosing the MBOM within the housing.

In some embodiments, the MBOM may be a first MBOM, and the method may further comprise supporting at least a second MBOM on the printed circuit board assembly and coupling the second MBOM to the external connector associated with the first MBOM or a separate external connector. The second MBOM may be configured to convert between optical signals and corresponding electrical signals for respectively transmitting or receiving optical signals through a fiber optic cable.

Accordingly, as described herein, embodiments of the present invention allow for a system for converting between electrical signals and optical signals in a datacenter, where the system comprises a main switch system box 5 configured to transmit and receive electrical signals and a field replaceable modular optical interconnect unit 45, as described above with reference to FIGS. 2-5. As described above, the field replaceable modular optical interconnect unit 45 may be configured to be electrically connected to the main switch system box 5 via engagement of the board-to-board connector 50 of the field replaceable modular optical interconnect unit with the mating board-to-board connector 26 of the main switch system box when the housing 55 of the field replaceable modular optical interconnect unit is received by the main switch system box.

In some embodiments, the main switch system box 5 may be configured to receive multiple field replaceable modular optical interconnect units 45 (e.g., two or three or more), such as by defining multiple cut outs 27 in the front portion 24 of the main switch system box, each cut out configured to receive a field replaceable modular optical interconnect unit. In this regard, the main switch system box 5 may be configured to operate each field replaceable modular optical interconnect unit 45 individually or collectively, according to the needs and preferences of the user. For example, in some cases, each field replaceable modular optical interconnect unit 45 may comprise external connectors 125 having different size and fiber channel counts, and the main switch system box 5 may be configured to use the appropriate field replaceable modular optical interconnect unit depending on the configuration and connection specifications of the external component to which the optical signals are to be transmitted or from which the optical signals are to be received.

Accordingly, embodiments of the present invention add modularity to the switch system and allow for multiple compatible field replaceable modular optical interconnect units to be received by a main switch system box, either at the same time (e.g., in cases where the main switch system box is configured to accommodate multiple field replaceable modular optical interconnect units via multiple cut outs) or allow for the easy replacement of one field replaceable modular optical interconnect unit with another. In this way, embodiments of the present invention allow a field replaceable modular optical interconnect unit to be replaced in the event of failure without necessitating the replacement of the entire main switch system box 5 or incurring significant time off-line while repairs are being made. Embodiments of the present invention also allow for the use of a variable number of optical connectors, such as optical connectors with different sizes and fiber channel counts, as well as combinations of optical connectors with copper or other connectors, thereby enabling increased capability and variability of the entire main switch system box.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components (e.g., components of the respective PCBs, transceivers, MBOMs, etc.) may also be part of the field replaceable modular optical interconnect unit and/or the main switch system box. In addition, although the examples provided above describe the use of an MBOM supported on a PCB assembly within the field replaceable modular optical interconnect unit, it is understood that the field replaceable modular optical interconnect unit may be configured to house any other electrical to optical converter unit, such as any optical module that can be mounted onto a PCB and/or is COBO-compliant. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in FIG. 6, and in some cases one or more of the steps depicted may occur substantially simultaneously. Although specific terms are employed herein, they are used in a generic and descriptive sense only and not for purposes of limitation.

What is claimed is:

1. A field replaceable modular optical interconnect unit configured to be received by a main switch system box installed in a datacenter rack, the field replaceable modular optical interconnect unit comprising:
   a housing comprising at least a front panel, a rear panel, and side panels extending between the front and rear panels;
   a printed circuit board assembly supported within the housing;
   an optical module supported on the printed circuit board assembly and configured to convert between optical signals and corresponding electrical signals for respectively transmitting or receiving optical signals through a fiber optic cable;
   a board-to-board connector disposed on the rear panel of the housing and configured to enable electrical signals to be transmitted between the printed circuit board assembly and a main switch system box; and
   an external connector disposed on the front panel of the housing and configured to engage an external optical fiber for transmitting optical signals between the optical module and an external component,
   wherein the field replaceable modular optical interconnect unit is configured to be received by the main switch system box of a datacenter rack, such that the field replaceable modular optical interconnect unit is electrically connected to the main switch system box via engagement of the board-to-board connector with a corresponding connector of the main switch system box, and
   wherein the field replaceable modular optical interconnect unit is configured to be removed from the main switch system box and replaced with another field replaceable modular optical interconnect unit while maintaining the main switch system box installed in the datacenter rack.

2. The field replaceable modular optical interconnect unit of claim 1, wherein the optical module comprises a mid board optical module (MBOM).

3. The field replaceable modular optical interconnect unit of claim 1, wherein the external connector is a first external connector, wherein the field replaceable modular optical interconnect unit further comprises a second external connector disposed on the front panel of the housing and configured to enable transmission of electrical signals between the printed circuit board assembly and an external component connected thereto.

4. The field replaceable modular optical interconnect unit of claim 1, wherein the side panels comprise an engaging feature configured to mate with a corresponding engaging feature of the main switch system box for enabling the field replaceable modular optical interconnect unit to be received therein.

5. The field replaceable modular optical interconnect unit of claim 1, wherein the front panel of the housing defines a handle configured to be gripped by a user for extracting the field replaceable modular optical interconnect unit from the main switch system box.

6. The field replaceable modular optical interconnect unit of claim 1, wherein the housing further comprises a top panel configured to enclose the optical module within the housing.

7. The field replaceable modular optical interconnect unit of claim 1, wherein the optical module is a first optical module, the field replaceable modular optical interconnect unit further comprising at least a second optical module supported by the printed circuit board assembly and coupled to the external connector associated with the first optical module or a separate external connector.

8. A method of assembling a field replaceable modular optical interconnect unit configured to be received by a main switch system box installed in a datacenter rack, the method comprising:
    constructing a housing, wherein the housing comprises at least a front panel, a rear panel, and side panels extending between the front and rear panels;
    disposing a printed circuit board assembly within the housing;
    supporting an optical module on the printed circuit board assembly, wherein the optical module is configured to convert between optical signals and corresponding electrical signals for respectively transmitting or receiving optical signals through a fiber optic cable;
    installing a board-to-board connector on the rear panel of the housing, wherein the board-to-board connector is configured to enable electrical signals to be transmitted between the printed circuit board assembly and a main switch system box; and
    installing an external connector on the front panel of the housing, wherein the external connector is configured to engage an external optical fiber for transmitting optical signals between the optical module and an external component,
    wherein the field replaceable modular optical interconnect unit is configured to be received by the main switch system box, such that the field replaceable modular optical interconnect unit is electrically connected to the main switch system box via engagement of the board-to-board connector with a corresponding connector of the main switch system box, and
    wherein the field replaceable modular optical interconnect unit is configured to be removed from the main switch system box and replaced with another field replaceable modular optical interconnect unit.

9. The method of claim 8, wherein supporting an optical module on the printed circuit board assembly comprises supporting a mid board optical module (MBOM) on the printed circuit board assembly.

10. The method of claim 8, wherein the external connector is a first external connector, wherein the method further comprises installing a second external connector on the front panel of the housing that is configured to enable transmission of electrical signals between the printed circuit board assembly and an external component.

11. The method of claim 8 further comprising providing an engaging feature on the side panels of the housing that are configured to mate with a corresponding engaging feature of the main switch system box for enabling the field replaceable modular optical interconnect unit to be received therein.

12. The method of claim 8 further comprising securing a handle to the front panel of the housing, wherein the handle is configured to be gripped by a user for extracting the field replaceable modular optical interconnect unit from the main switch system box.

13. The method of claim 8, wherein constructing the housing further comprises attaching a top panel to the front, rear, and side panels for enclosing the optical module within the housing.

14. The method of claim 8, wherein the optical module is a first optical module, the method further comprising supporting at least a second optical module on the printed circuit board assembly and coupling the second optical module to the external connector associated with the first optical module or a separate external connector, wherein the second optical module is configured to convert between optical signals and corresponding electrical signals for respectively transmitting or receiving optical signals through a fiber optic cable.

15. A system for converting between electrical signals and optical signals in a datacenter, the system comprising:
    a main switch system box configured to transmit and receive electrical signals installed in a datacenter rack; and
    a field replaceable modular optical interconnect unit configured to be received by the main switch system box, the field replaceable modular optical interconnect unit comprising:
        a housing comprising at least a front panel, a rear panel, and side panels extending between the front and rear panels;
        a printed circuit board assembly supported within the housing;
        an optical module supported on the printed circuit board assembly and configured to convert between optical signals and corresponding electrical signals for respectively transmitting or receiving optical signals through a fiber optic cable;
        a board-to-board connector disposed on the rear panel of the housing and configured to enable electrical signals to be transmitted between the printed circuit board assembly and a main switch system box; and
        an external connector disposed on the front panel of the housing and configured to engage an external optical fiber for transmitting optical signals between the optical module and an external component,
        wherein the field replaceable modular optical interconnect unit is configured to be received by the main switch system box of the datacenter rack, such that the field replaceable modular optical interconnect unit is electrically connected to the main switch system box via engagement of the board-to-board connector with a corresponding connector of the main switch system box, and
    wherein the field replaceable modular optical interconnect unit is configured to be removed from the main switch system box and replaced with another field replaceable modular optical interconnect unit while maintaining the main switch system box installed in the datacenter rack.

16. The system of claim 15, wherein the main switch system box is configured to receive multiple field replaceable modular optical interconnect units, wherein the main switch system box is configured to operate each field replaceable modular optical interconnect unit individually or collectively.

17. The system of claim 16, wherein each field replaceable modular optical interconnect unit comprises external connectors having different size and fiber channel counts.

18. The system of claim 15, wherein the side panels of the housing of the field replaceable modular optical interconnect unit comprise an engaging feature configured to mate with a corresponding engaging feature of the main switch system box for enabling the field replaceable modular optical interconnect unit to be received therein.

19. The system of claim 15, wherein the external connector is a first external connector, wherein the field replaceable modular optical interconnect unit further comprises a second external connector disposed on the front panel of the housing and configured to enable transmission of electrical signals between the printed circuit board assembly and an external component connected thereto.

20. The system of claim 15, wherein the front panel of the housing defines a handle configured to be gripped by a user for extracting the field replaceable modular optical interconnect unit from the main switch system box.

\* \* \* \* \*